US009490716B2

(12) United States Patent
Tseng et al.

(10) Patent No.: US 9,490,716 B2
(45) Date of Patent: Nov. 8, 2016

(54) ISOLATED CONVERTER WITH INITIAL RISING EDGE PWM DELAY

(71) Applicant: LITE-ON TECHNOLOGY CORP., Taipei (TW)

(72) Inventors: Po-Jung Tseng, Taipei (TW); Chin-Chuan Huang, Taipei (TW); Sin-Li Lin, Taipei (TW); Yu-Kang Lo, Taipei (TW); Huang-Jen Chiu, Taipei (TW); Jing-Yuan Lin, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 105 days.

(21) Appl. No.: 14/049,456

(22) Filed: Oct. 9, 2013

(65) Prior Publication Data

US 2014/0112027 A1 Apr. 24, 2014

(30) Foreign Application Priority Data

Oct. 19, 2012 (TW) .............................. 101138735 A

(51) Int. Cl.
*H02M 3/335* (2006.01)

(52) U.S. Cl.
CPC ..... *H02M 3/33546* (2013.01); *H02M 3/33592* (2013.01); *Y02B 70/1475* (2013.01)

(58) Field of Classification Search
CPC .................... H02M 3/33546; H02M 3/33592; H02M 3/33553; H02M 3/335; H02M 3/33523; H02M 3/33507; H02M 3/3385; H02M 3/3376; Y02B 70/1475
See application file for complete search history.

(56) References Cited

U.S. PATENT DOCUMENTS

| 5,995,381 | A | * | 11/1999 | Wakamatsu | ............ H02M 1/38 363/133 |
|---|---|---|---|---|---|
| 7,869,231 | B2 | * | 1/2011 | Cohen | ........................ 363/21.14 |
| 2008/0002441 | A1 | * | 1/2008 | Allinder | ...................... 363/21.14 |
| 2012/0257421 | A1 | * | 10/2012 | Brkovic | ...................... 363/21.07 |
| 2013/0194836 | A1 | * | 8/2013 | Morris et al. | ............... 363/21.14 |
| 2015/0138844 | A1 | * | 5/2015 | Karlsson | ........... H02M 3/33592 363/21.1 |

* cited by examiner

*Primary Examiner* — Harry Behm
*Assistant Examiner* — Peter Novak
(74) *Attorney, Agent, or Firm* — Rosenberg, Klein & Lee

(57) ABSTRACT

A power converting device includes a transformer, a first switch coupled to a primary winding of the transformer, a PWM controller which generates a first PWM signal for controlling conduction and non-conduction of the first switch and which generates a control signal that leads the first PWM signal, a rectifier-filter circuit which rectifies an induced voltage generated by a secondary winding of the transformer, a second switch coupled to the secondary winding, and a synchronous rectifier controller which controls conduction and non-conduction of the second switch, and which controls, according to the control signal, the second switch to become non-conductive prior to conduction of the first switch.

15 Claims, 12 Drawing Sheets

ISOLATED CONVERTER WITH INITIAL RISING EDGE PWM DELAY

CROSS-REFERENCE TO RELATED APPLICATION

This application claims priority of Taiwanese Patent Application No. 101138735, filed on Oct. 19, 2012.

BACKGROUND OF THE INVENTION

1. Field of the Invention

The invention relates to a power converting device, more particularly to a power converting device which adopts a synchronous rectifier circuit technique.

2. Description of the Related Art

In a conventional forward power converter, a main switch is disposed at the primary side thereof, and a rectifier circuit which is composed of rectifier diodes is disposed at a secondary side thereof. However, a considerable energy loss is incurred from conduction of the rectifier diodes. Therefore, referring to FIG. 1, a synchronous rectifier switch (MOS transistor switch) Q2 is usually adopted to replace the rectifier diodes at the secondary side of a transformer T1 of an existing forward power converter, and a synchronous rectifier controller 6 is used to control conduction and non-conduction of the synchronous rectifier switch Q2.

The existing synchronous rectifier controller 6 is able to operate in one of a discontinuous conduction mode (DOM) and a continuous conduction mode (CCM) in response to a requirement for different loads of the forward power converter. For example, a conventional synchronous rectifier controller of a model number SG6203 is able to detect the voltage drop at the synchronous rectifier switch Q2, and thereby is able to detect a magnitude of a current associated with the synchronous rectifier switch Q2, so as to control the synchronous rectifier switch Q2 to become non-conductive upon detecting that the magnitude of the current drops to zero. However, the aforementioned control method is only suitable for the DCM.

In the CCM, since the synchronous rectifier switch Q2 is required to be switched to be non-conductive before an output current (i.e., a current flowing through the synchronous rectifier switch Q2) drops to zero, the synchronous rectifier controller of the model number SG6203 is incapable of operating in the CCM by means of detecting the magnitude of the current through the synchronous rectifier switch Q2. Therefore, the SG6203 still requires an RC (resistor-capacitor) trigger to forcibly turn off the synchronous rectifier circuit Q2. However, owing to the RC time constant of the RC trigger, the aforementioned solution is not suitable for a situation where a load varies rapidly.

Furthermore, a conventional synchronous rectifier controller of a model number STSR30 utilizes an up counter and a down counter of a digital circuit to calculate most recent duty cycles of the main switch Q1 and the synchronous rectifier switch Q2. The most recent duty cycles thus calculated are adapted to serve as next duty cycles of the main switch Q1 and the synchronous rectifier switch Q2, such that the STSR30 is able to operate in the DCM and the CCM.

On the other hand, a conventional synchronous rectifier controller of a model number FAN6204 applies the volt-second balance principle, and calculates charge time and discharge times of a timing capacitor so as to control conduction time of the main switch Q1 and the synchronous rectifier switch Q2. Specifically, when the main switch Q1 is conductive, the timing capacitor is charged until the main switch Q1 becomes non-conductive, and subsequently, the timing capacitor starts to discharge and to cause the synchronous rectifier switch Q2 to become conductive until the timing capacitor discharges completely. In this way, the FAN6204 is able to operate in the DCM and the CCM.

All of the aforesaid synchronous rectifier controllers of model numbers SG6203, STSR30, and FAN6204 utilize the charging and discharging of a capacitor for counting and for determining the conducting time and non-conducting time of switches. Nevertheless, the capacitor takes a response time to charge and discharge, such that when the load varies rapidly, for example, referring to FIG. 2, within a time interval t1 when the load varies from a heavy load to a light load, the synchronous rectifier controller may not catch up with switching changes of the main switch Q1 because it takes time for the capacitor to charge and discharge. The synchronous rectifier switch Q2 may thus not be turned off (i.e., non-conductive) in time, so that the main switch Q1 at the primary side may become conductive at the time when the synchronous rectifier switch Q2 is not yet turned off. In this situation, the synchronous rectifier switch Q2 has to sustain an instantaneous high voltage generated by a secondary winding according to induction of an electromagnetic field from a primary winding. At the same time, since the synchronous rectifier switch Q2 is still conductive, when an output current $I_{LO}$ drops to zero, a reverse current Ir occurs as a result of an output capacitor Co discharging toward an output inductor Lo and the synchronous rectifier switch Q2, such that a voltage spike $V_{sp}$ is generated between a drain terminal and a source terminal of the synchronous rectifier switch Q2 at the instant when the synchronous rectifier switch Q2 turns off. The synchronous rectifier switch Q2 may be damaged by the voltage spike $V_{sp}$ if it has insufficient voltage tolerance.

This reverse current Ir not only occurs when the load varies rapidly, but also occurs at the moment when the power converter is started up or shut down. When the power converter is started up or shut down, the output current $I_{LO}$ may have a moment of zero current, such that the synchronous rectifier switch Q2 may be damaged by the voltage spike $V_{sp}$ if not turned off in time. A synchronous rectifier forward converter including a reverse current suppressor is disclosed in U.S. Pat. No. 7,589,982. The synchronous rectifier switch thereof is adapted to be turned off earlier than shutdown of the synchronous rectifier forward converter so as to eliminate or suppress the reverse current. However, the synchronous rectifier forward converter discussed therein is also incapable of preventing generation of the reverse current under the condition that the load varies rapidly.

SUMMARY OF THE INVENTION

Therefore, an object of the present invention is to provide a power converting device which ensures that, no matter which one of the CCM or DCM the power converting device operates, the switches at the primary side and the secondary side of a transformer may be prevented from conducting at the same time. Moreover, when the load varies rapidly or when the power converting device is started up or shut down, generation of the reverse current may also be prevented, so as to promote circuit stability.

Accordingly, the power converting device of the present invention comprises a transformer, a first switch, a pulse-width modulation (PWM) controller, a rectifier-filter circuit, a second switch, and a synchronous rectifier controller.

The transformer includes primary winding for receiving an input voltage, and a secondary winding which generates an induced voltage in response to induction associated with receipt of the input voltage by said primary winding. The first switch has a first end coupled electrically to one end of the primary winding, a grounded second end, and a control end. The PWM controller is coupled electrically to the control end of the first switch, generates a first PWM signal for controlling conduction and non-conduction of the first switch, and generates a control signal that leads the first PWM signal. The rectifier-filter circuit is coupled electrically to a first end of the secondary winding and rectifies the induced voltage so as to generate a direct-current (DC) output voltage. The second switch has a control end, a first end coupled electrically to the rectifier-filter circuit, and a second end that is coupled electrically to a second end of the secondary winding. The synchronous rectifier controller is coupled electrically to the second switch for controlling conduction and non-conduction of said second switch, and receives the control signal generated by the PWM controller, so as to control, according to the control signal, the second switch to become non-conductive prior to conduction of said first switch.

BRIEF DESCRIPTION OF THE DRAWINGS

Other features and advantages of the present invention will become apparent in the following detailed description of two preferred embodiments with reference to the accompanying drawings, of which.

DETAILED DESCRIPTION OF THE PREFERRED EMBODIMENTS

Figure 1:
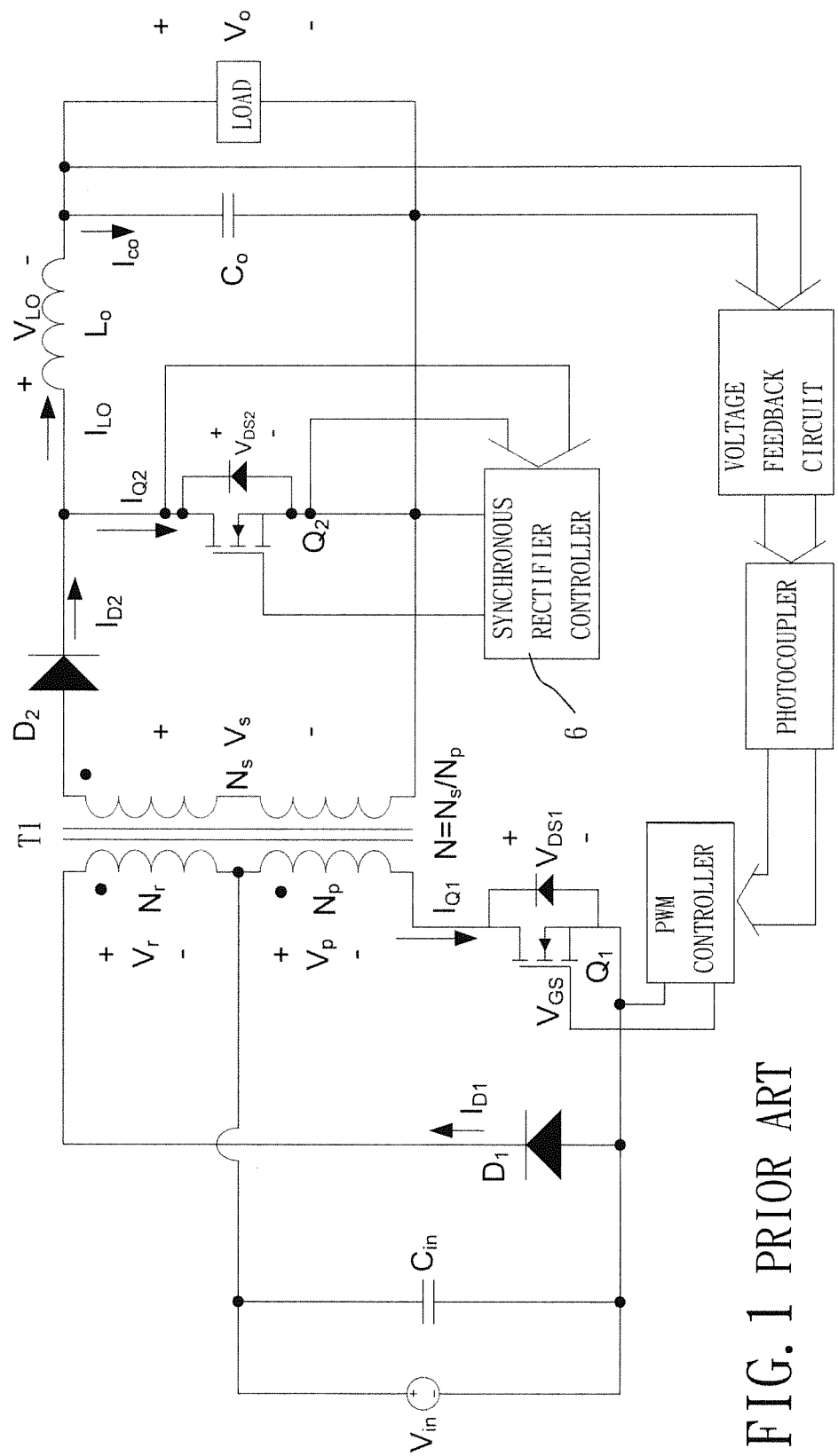
FIG. 1 illustrates a circuit diagram of an existing forward power converter.
Figure 2:
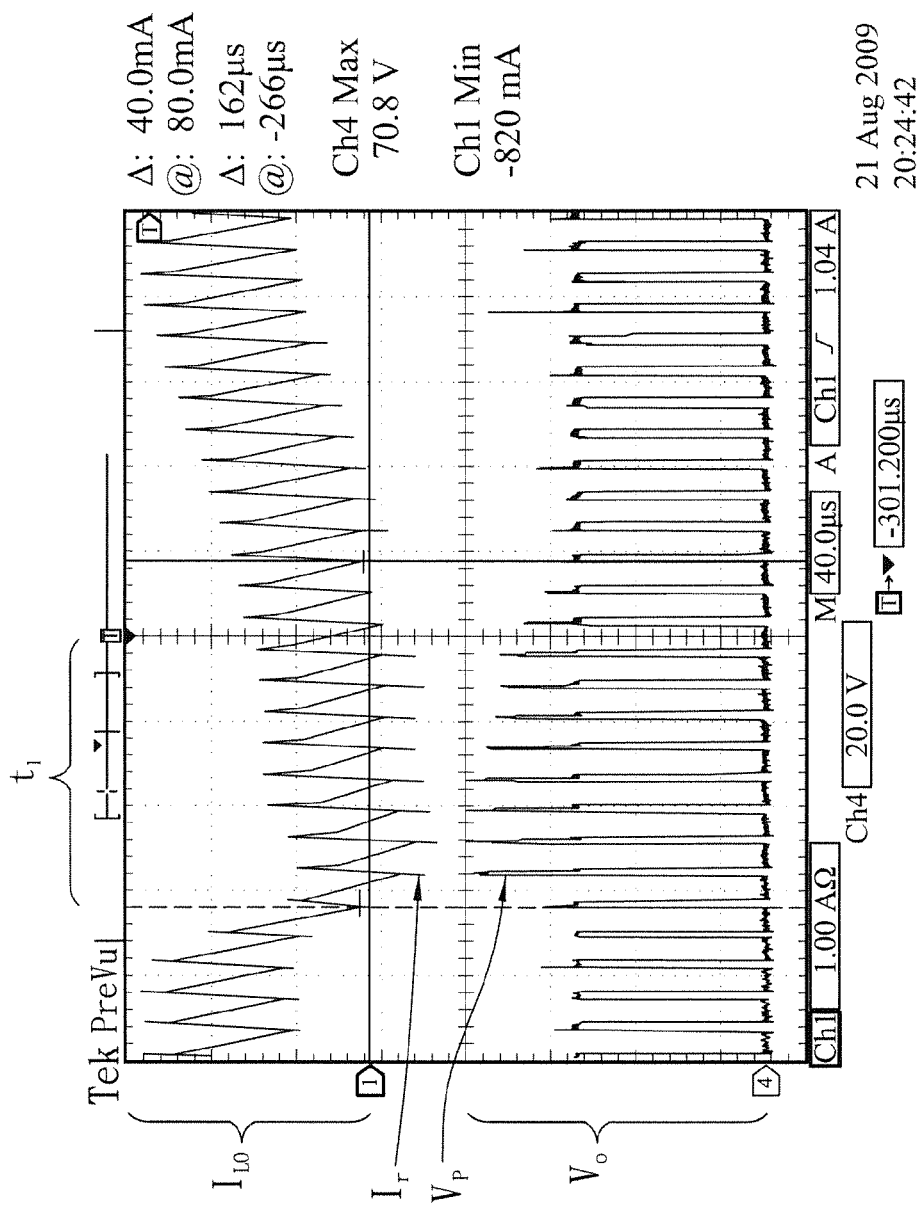
FIG. 2 illustrates that, while the existing forward power converter operates in a continuous conduction mode (CCM), a voltage spike $V_{sp}$ is generated between a drain terminal and a source terminal of a synchronous rectifier switch within a time interval t1 when a load varies from a heavy load to a light load.
Figure 3:
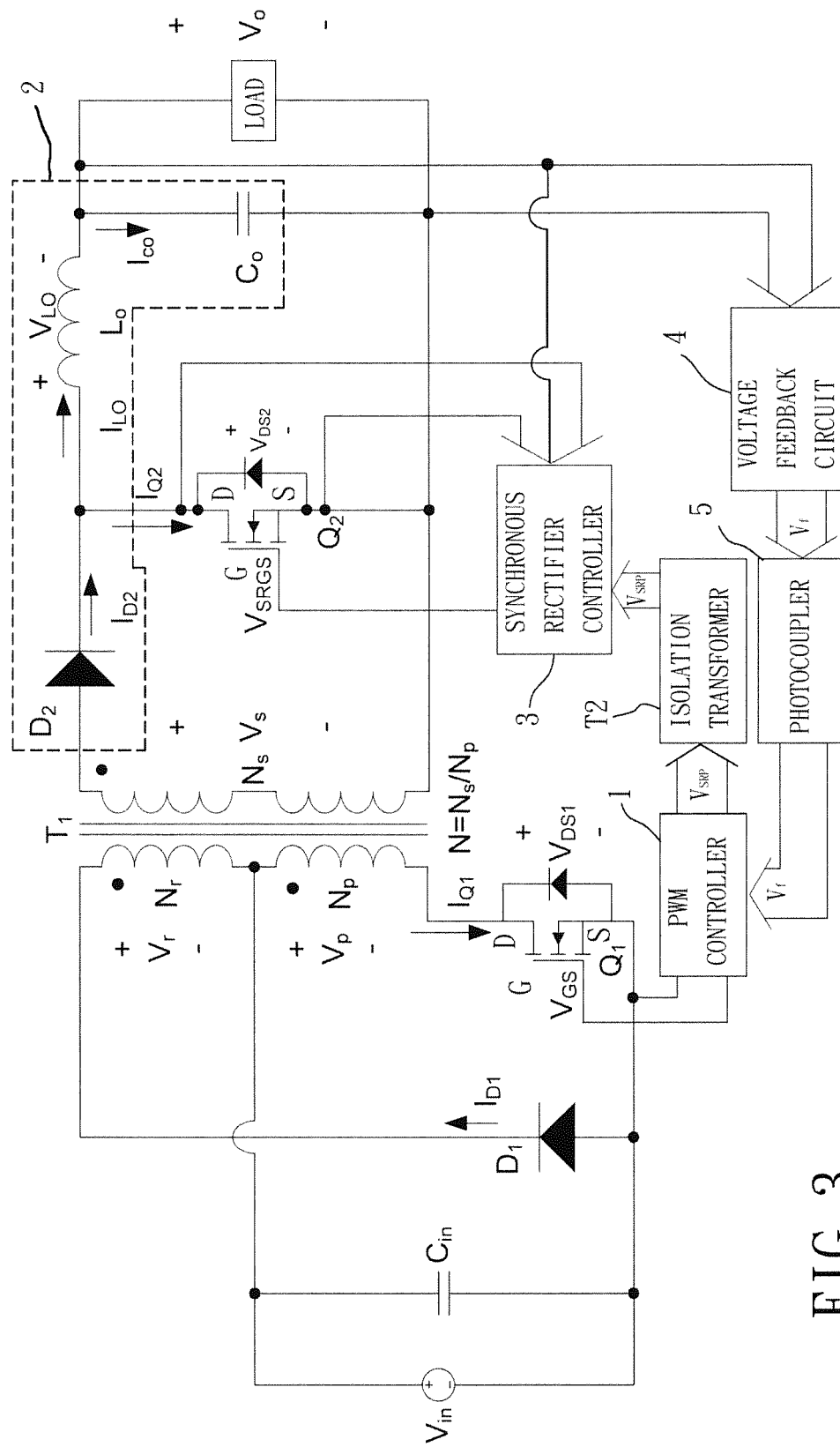
FIG. 3 is a circuit diagram of a forward converter illustrating a first preferred embodiment of a power converting device of the present invention.
Figure 4:
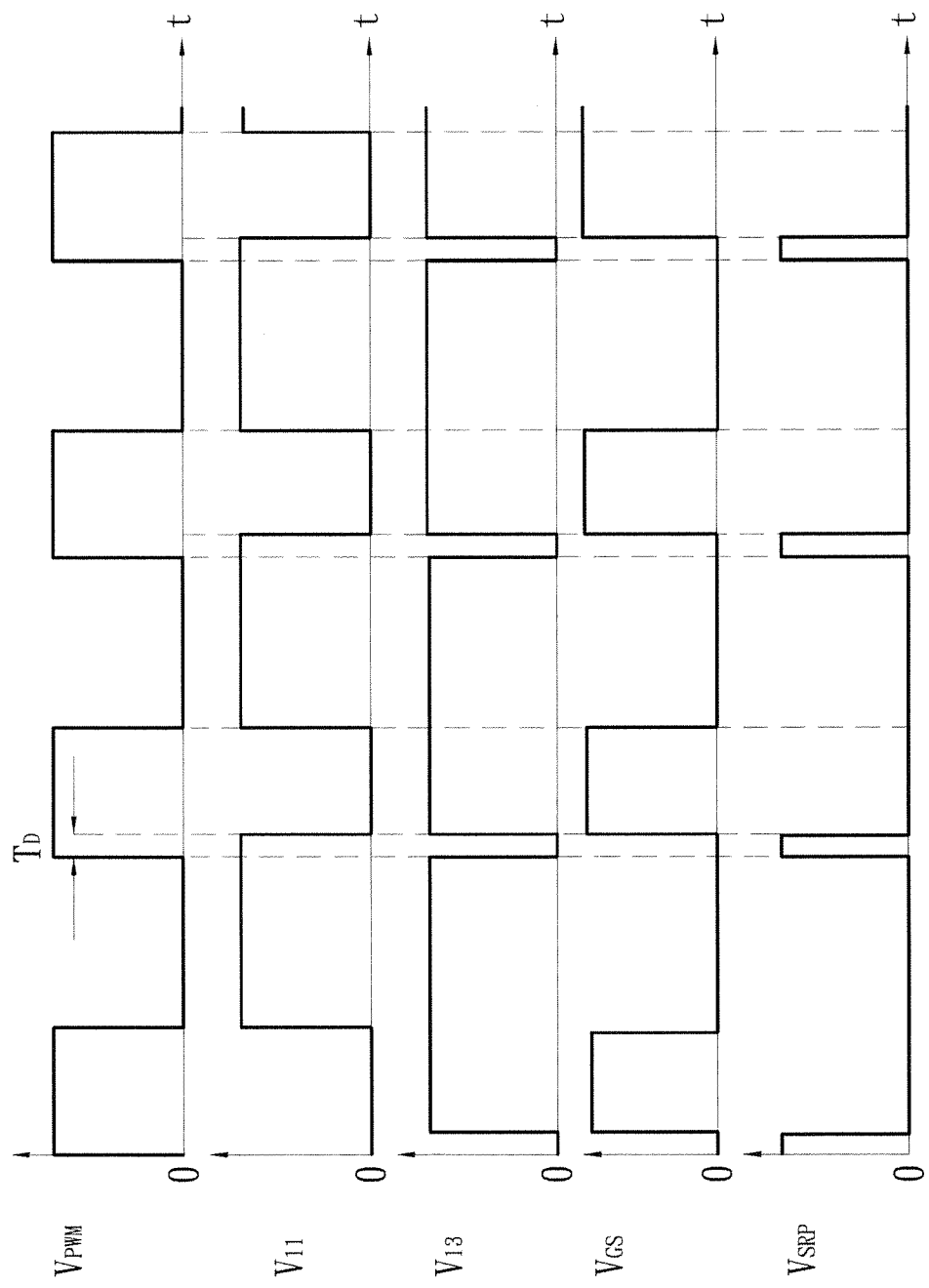
FIG. 4 illustrates waveforms of a first pulse-width modulation (PWM) signal $V_{GS}$ and a control signal $V_{SRP}$ generated by a PWM controller in the first preferred embodiment.

Referring to FIG. 3, a forward power converter is given as an example for a first preferred embodiment of a power converting device according to the present invention. The first preferred embodiment of the power converting device comprises a transformer $T_1$, a first switch (i.e., a main switch) Q1, a pulse-width modulation (PWM) controller 1, a rectifier-filter circuit 2, a second switch (i.e., a synchronous rectifier switch) Q2, and a synchronous rectifier controller 3.

The transformer T includes a primary winding $N_p$ and a secondary winding $N_s$. The primary winding $N_p$ has a first end coupled electrically to a high voltage side of an input source for receiving an input voltage $V_{in}$. The secondary winding $N_s$ generates an induced voltage $V_s$ in response to induction associated with receipt of the input voltage $V_{in}$ by the primary winding $N_p$.

The first switch Q1 is a Metal-Oxide-Semiconductor Field Effect Transistor (MOSFET), and has a first end (Drain) D coupled electrically to a second end of the primary winding $N_p$, a second end (Source) S coupled electrically to a low voltage side of the input source (for example, grounded), and a control end (Gate) G.

The PWM controller 1 is coupled electrically to the control end G of the first switch Q1, generates a first PWM signal $V_{GS}$ for controlling conduction and non-conduction of the first switch Q1, and generates a control signal $V_{SRP}$ that leads the first PWM signal $V_{GS}$.

The rectifier-filter circuit 2 is coupled electrically to a first end (i.e., a dotted-end) of the secondary winding $N_s$ and rectifies the induced voltage $V_s$ so as to generate a direct-current (DC) output voltage $V_o$. The rectifier-filter circuit 2 is composed of a series connection of a diode $D_2$, an output inductor $L_o$ and an output capacitor $C_o$. The diode D has an anode coupled electrically to the dotted-end of the secondary winding $N_s$, and the output capacitor $C_o$ is coupled electrically to a second end (i.e., a non-dotted end) of the secondary winding $N_s$.

The second switch Q2 is a MOSFET, and has a control end (Gate) G, a first end (Drain) D coupled electrically to the rectifier-filter circuit 2, and a second end (Source) S. Specifically, the first end D of the second switch Q2 is coupled electrically to a cathode of the diode $D_2$, and the second end S thereof is coupled electrically to the non-dotted end of the secondary winding $N_s$.

The synchronous rectifier controller 3 is coupled electrically to the control end G of the second switch Q2 for controlling conduction and non-conduction of the second switch Q2, and receives the control signal $V_{SRP}$ generated by the PWM controller 1, so as to control, according to the control signal $V_{SRP}$, the second switch Q2 to become non-conductive prior to conduction of the first switch Q1.

More specifically, the power converting device further comprises a voltage feedback circuit 4 and a photocoupler 5. The voltage feedback circuit 4 obtains a feedback voltage $V_f$ from the DC output voltage $V_o$, and feeds the feedback voltage $V_f$ back to the PWM controller 1 via the photocoupler 5, for enabling the PWM controller 1 to generate an initial PWM signal $V_{PWM}$ according to the feedback voltage $V_f$.

Figure 5:
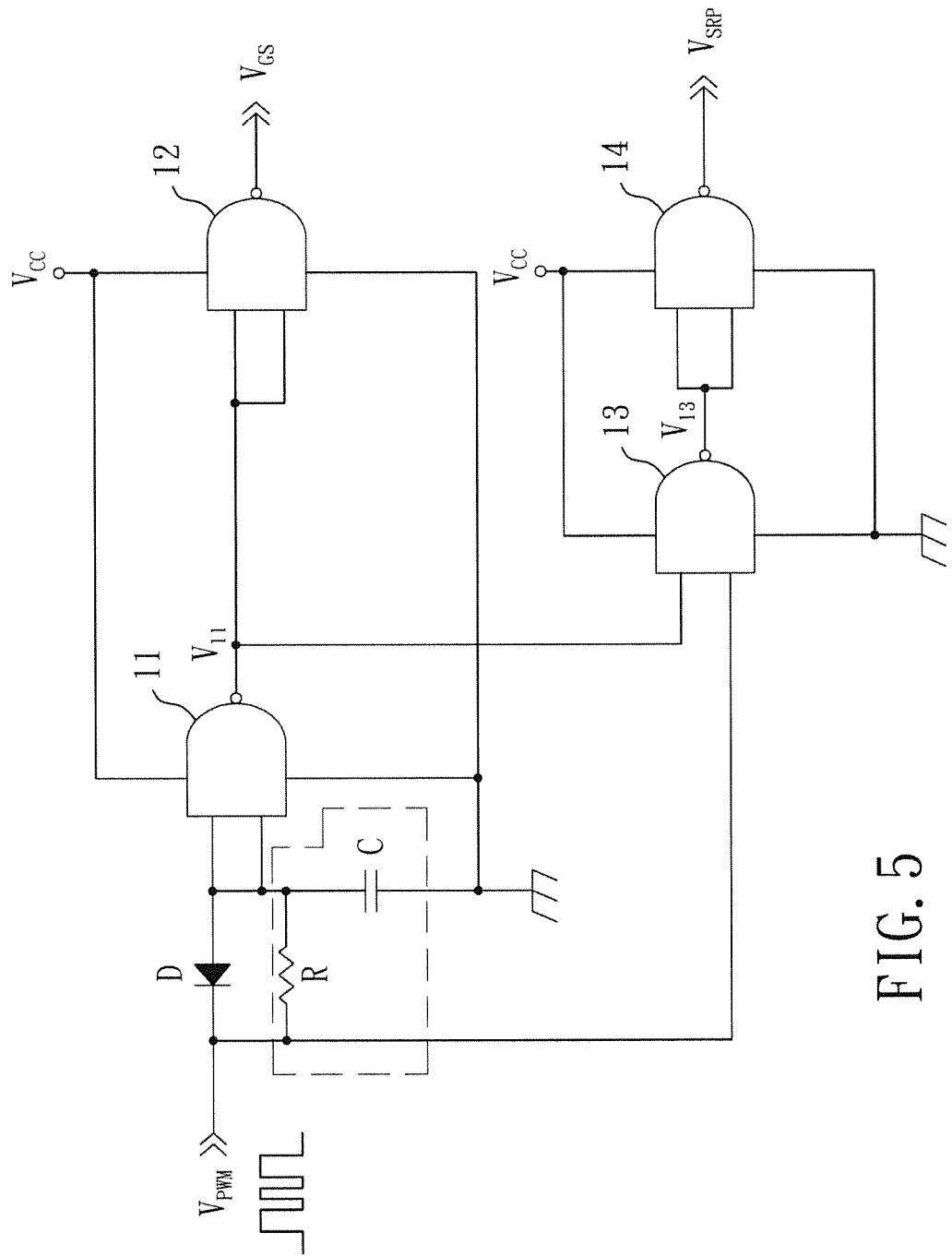
FIG. 5 is a logic circuit diagram of the PWM controller in the first preferred embodiment.

Referring to FIG. 5, the PWM controller 1 includes a first NAND gate 11, a resistor R, a diode D, a capacitor C, a second NAND gate 12, a third NAND gate 13, and a fourth NAND gate 14. The first NAND gate 11 has two input terminals that are electrically coupled, and has an output terminal. The resistor R has a first end for receiving the initial PWM signal $V_{PWM}$, and has a second end coupled electrically to the input terminals of the first NAND gate 11. The diode D is connected in parallel with the resistor R, and blocks input of the initial PWM signal $V_{PWM}$ to the first NAND gate 11 therethrough. The capacitor C has a first end that is coupled electrically to the input terminals of the first NAND gate 11, and has a grounded second end. The capacitor C cooperates with the resistor R to form a delay circuit. The second NAND gate 12 has two input terminals that are coupled electrically to the output terminal of the first NAND gate 11, and has an output terminal that is coupled electrically to the first switch Q1 (see FIG. 3) and that outputs the first PWM signal $V_{GS}$. The third NAND gate 13 has a first input terminal that is coupled electrically to the output terminal of the first NAND gate 11, has a second input terminal for receiving the initial PWM signal $V_{PWM}$, and has an output terminal. The fourth NAND gate 14 has two input terminals that are coupled electrically to the output terminal of the third NAND gate 13, and has an output terminal that outputs the control signal $V_{SRP}$.

The initial PWM signal $V_{PWM}$ is delayed by the delay circuit for a predetermined time (dead time) $T_D$. The initial PWM signal $V_{PWM}$ thus delayed is inputted to the first NAND gate 11 and is inverted thereby such that a first signal $V_{11}$ is outputted therefrom. The first signal $V_{11}$ is inputted to the second NAND gate 12 and is inverted once again such that the first PWM signal $V_{GS}$ is outputted at the output terminal of the second NAND gate 12. Meanwhile, the first signal $V_{11}$ and the initial PWM signal $V_{PWM}$ are inputted to the third NAND gate 13, and undergo the NAND logic operation, such that a second signal $V_{13}$ is outputted therefrom. The second signal $V_{13}$ is inputted to the fourth NAND gate 14 and is inverted thereby such that the control signal $V_{SRP}$ is outputted at the output terminal of the fourth NAND gate 14. In this way, the control signal $V_{SRP}$ will lead the first PWM signal $V_{GS}$ by the dead time $T_D$, that is, a difference between rising edges of the control signal $V_{SRP}$ and the first PWM signal $V_{GS}$ is the dead time $T_D$, and a pulse duration of the control signal $V_{SRP}$ is also the dead time $T_D$. The dead time $T_D$ is of several nanosecond ($10^{-9}$ second) scales, and a time constant of the delay circuit (RC circuit) is sufficiently small such that a response time of the delay circuit is far shorter than the time it takes for rapid variances of the load. Therefore, the power converting device of the present invention is able to operate normally in a situation where the load varies rapidly.

Referring once again to FIG. 3, the first preferred embodiment of the power converting device further comprises an isolation transformer T2 which is coupled electrically between the PWM controller 1 and the synchronous rectifier controller 3. The synchronous rectifier controller 3 receives the control signal $V_{SRP}$ from the PWM controller 1 via the isolation transformer T2.

The synchronous rectifier controller 3 is configured to detect a voltage at the first end D of the second switch Q2, and is configured to generate, based on the voltage thus detected, a second PWM signal $V_{SRGS}$ for controlling conduction and non-conduction of the second switch Q2.

Figure 6:
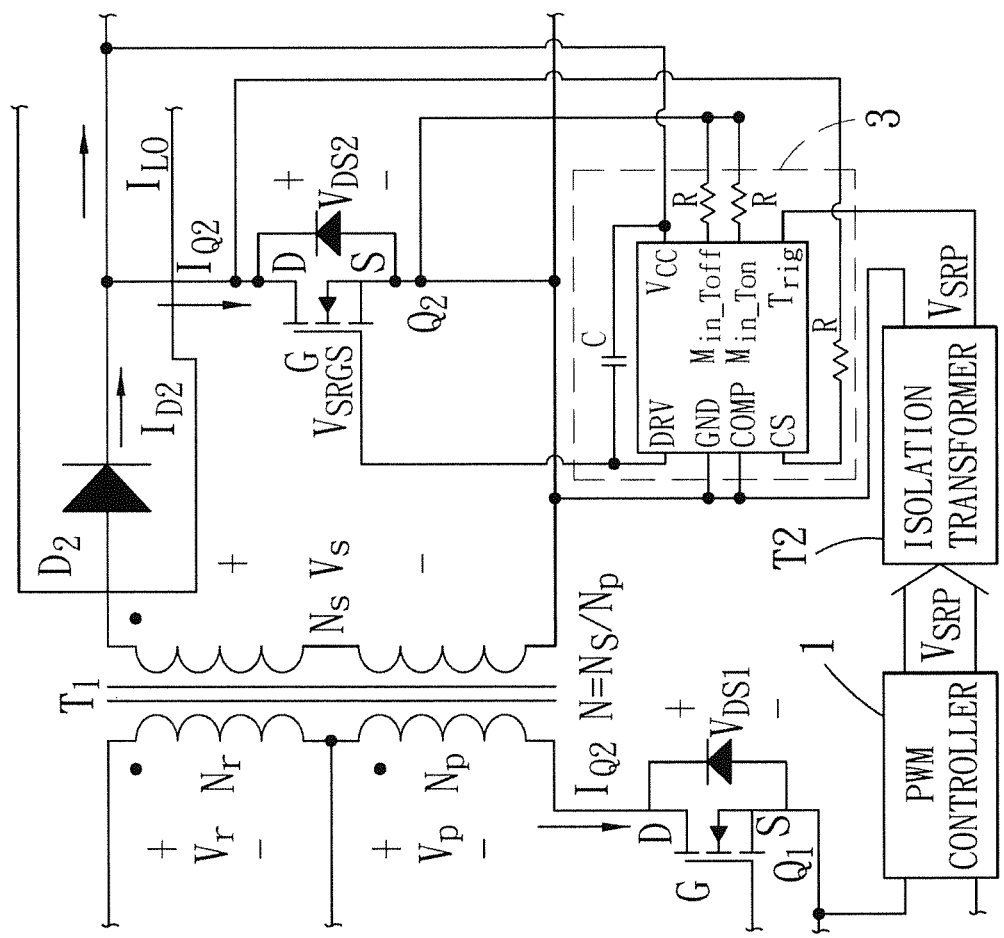
FIG. 6 illustrates connections of pins of a synchronous rectifier controller in the first preferred embodiment.

Specifically, the synchronous rectifier controller 3 of the first preferred embodiment may be implemented using an existing synchronous rectifier driver of model number NCP4303. Referring to FIG. 6, the synchronous rectifier driver includes a power source pin (Vcc) which is coupled electrically to the rectifier-filter circuit 2 for receiving the DC output voltage $V_o$, a minimum turn-off time pin (Min_T-off) and a minimum turn-on time pin (Min_Ton) which are coupled electrically to the second end S of the second switch Q2, a trigger pin (Trig) for receiving the control signal $V_{SRP}$, a detection pin (CS) which is coupled electrically to the first end D of the second switch Q2 for detecting the voltage at the first end D of the second switch Q2, a compensating inductance pin (COMP), a ground pin (GND), and a driving pin (DRV) which is coupled electrically to the control end G of the second switch Q2 and which outputs the second PWM signal $V_{SRGS}$ for controlling conduction and non-conduction of the second switch Q2.

Figure 7:
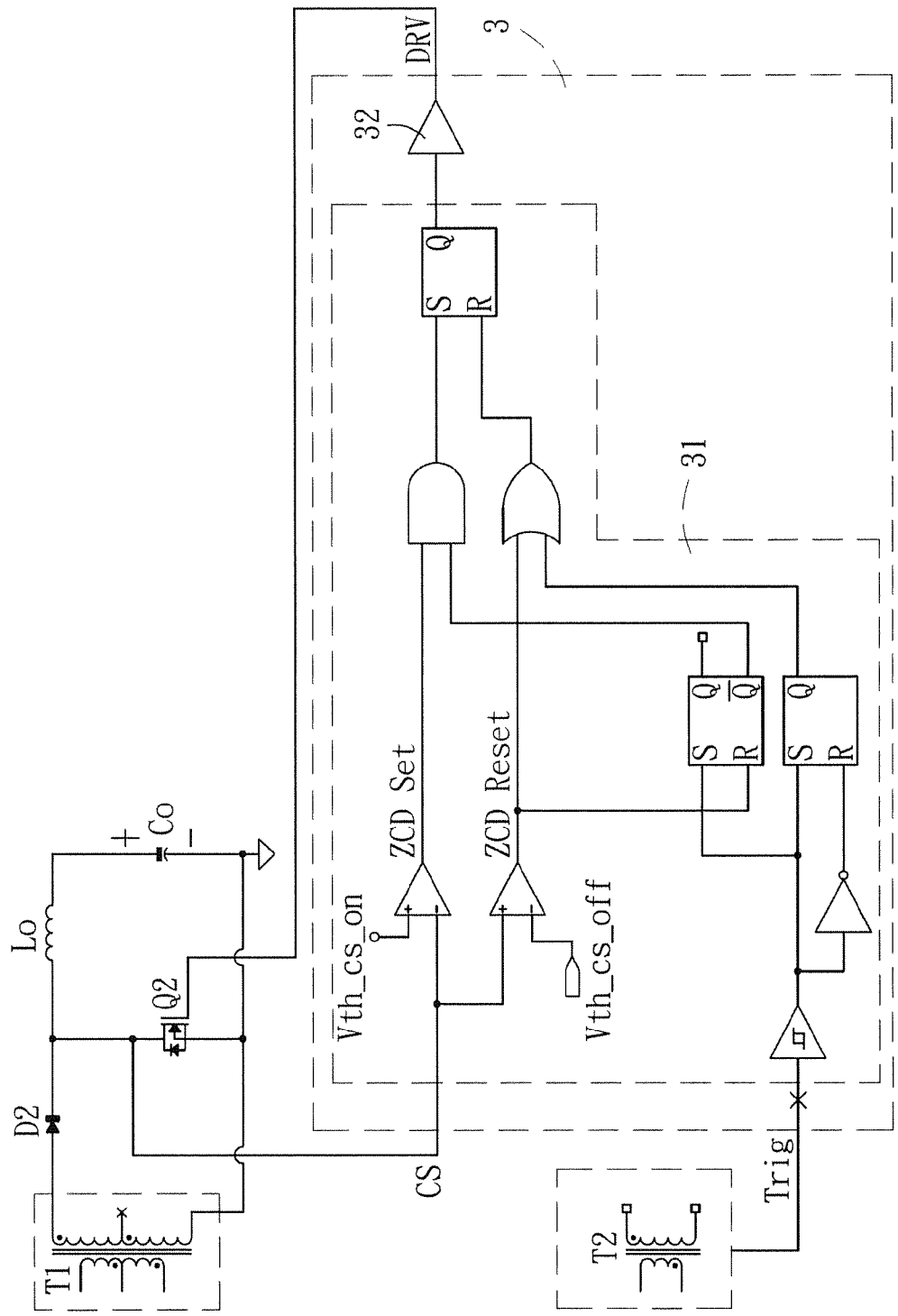
FIG. 7 illustrates a detailed circuit diagram of the synchronous rectifier controller in the first preferred embodiment.

Referring to FIG. 7, the synchronous rectifier controller 3 further includes a logic circuit 31 and a driver 32. The detection pin (CS) and the trigger pin (Trig) are coupled electrically to the logic circuit 31. The driver 32 is coupled electrically to the logic circuit 31 and has an output terminal coupled electrically to the driving pin (DRV).

Figure 8:
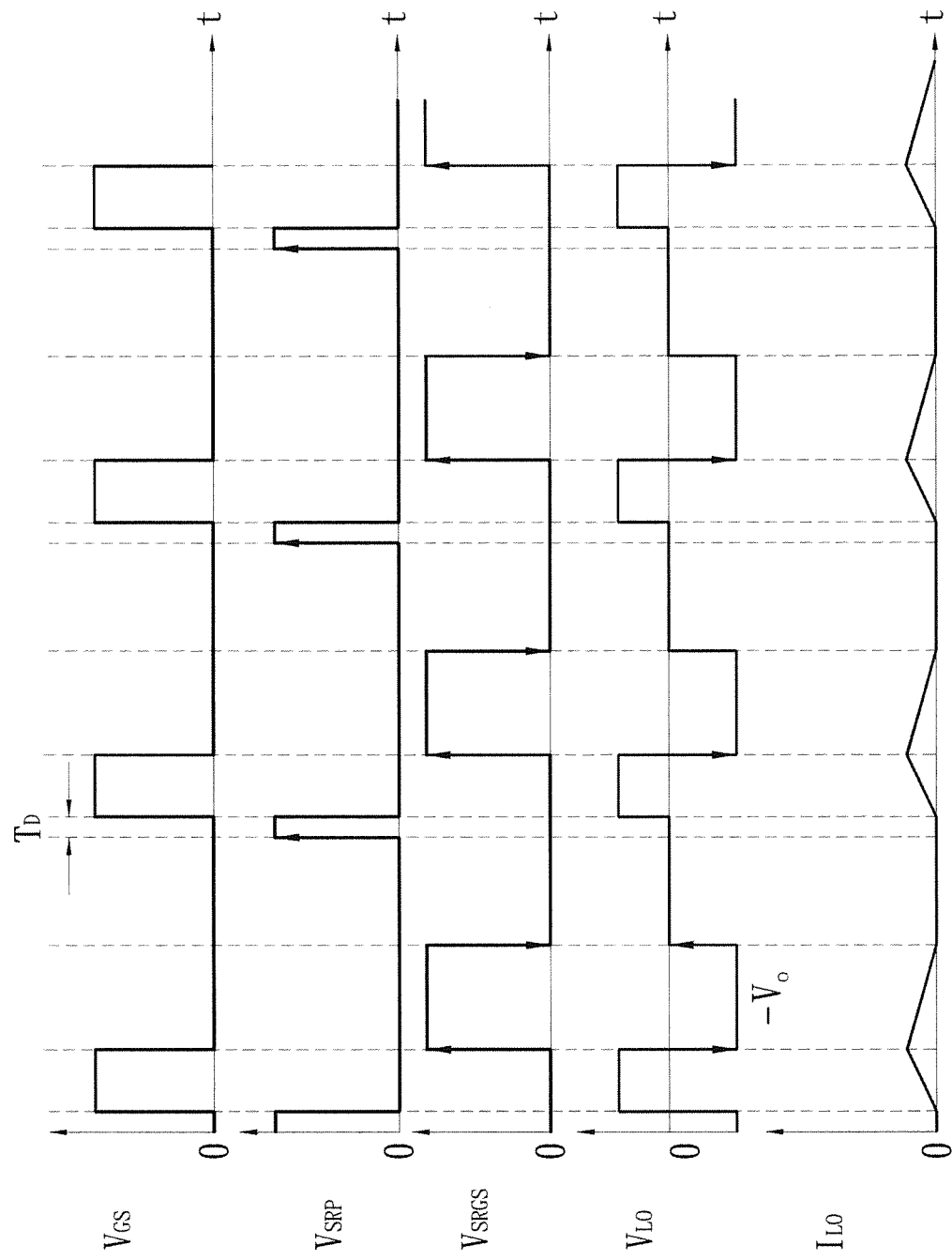
FIG. 8 illustrates waveforms of the first PWM signal $V_{GS}$, the control signal $V_{SRP}$, a second PWM signal $V_{SRGS}$, and an output current $I_{LO}$ and voltage $V_{LO}$ of an output indicator when the first preferred embodiment operates in a discontinuous conduction mode (DCM)

Referring to FIG. 8 in combination with FIG. 3, under a condition that the synchronous rectifier controller 3 operates in a discontinuous conduction mode (DCM), when the first PWM signal $V_{GS}$ for controlling the first switch Q1 falls from a high logic level to a low logic level so as to control the first switch Q1 to become non-conductive, there will be a current flowing through a body diode of the second switch Q2 such that the voltage $V_{DS2}$ detected at the first end D of the second switch Q2 drops. When the voltage $V_{DS2}$ detected at the first end D of the second switch Q2 drops to cause an electric potential at the detection pin (CS) to be lower than a predetermined conduction threshold voltage ($V_{th\_cs\_on}$), the logic circuit 31 generates a high logic level signal to the driver 32 such that the driver 32 outputs via the driving pin (DRV) the second PWM signal $V_{SRGS}$, which is at a high logic level, for driving the second switch Q2 to become conductive. When the voltage $V_{DS2}$ detected at the first end D of the second switch Q2 rises to cause the electric potential at the detection pin (CS) to be higher than a predetermined non-conduction threshold voltage ($V_{th\_cs\_off}$), at this moment, an output current $I_{LO}$ flowing through the output inductor $L_o$ is zero, and the logic circuit 31 generates a low logic level signal to the driver 32 such that the driver 32 outputs via the driving pin (DRV) the second PWM signal $V_{SRGS}$, which is at a low logic level, for driving the second switch Q2 to become non-conductive.

Consequently, the second PWM signal $V_{SRGS}$ outputted at the driving pin (DRV) is adapted to control the second switch Q2 to become conductive when the first switch Q1 is non-conductive, and to control the second switch Q2 to become non-conductive when the output current $I_{LO}$ drops to zero. Moreover, since the control signal $V_{SRP}$ is inputted into the trigger pin (Trig) in a manner that the rising edge of the control signal $V_{SRP}$ precedes the rising edge of the first PWM signal $V_{GS}$ by the dead time $T_D$, and since the second switch Q2 has been turned off (i.e., become non-conductive) before input of the rising edge of the control signal $V_{SRP}$, under the condition that the synchronous rectifier controller 3 operates in the DCM, the rapid variances of the load may not cause the first switch Q1 and the second switch Q2 to become conductive at the same time. Furthermore, since the second switch Q2 is controlled to become non-conductive when the output current $I_{LO}$ drops to zero, a reverse current which results from discharging of the output capacitor $C_o$ toward the output inductor $L_o$ and the second switch Q2 may not be generated.

Figure 9:
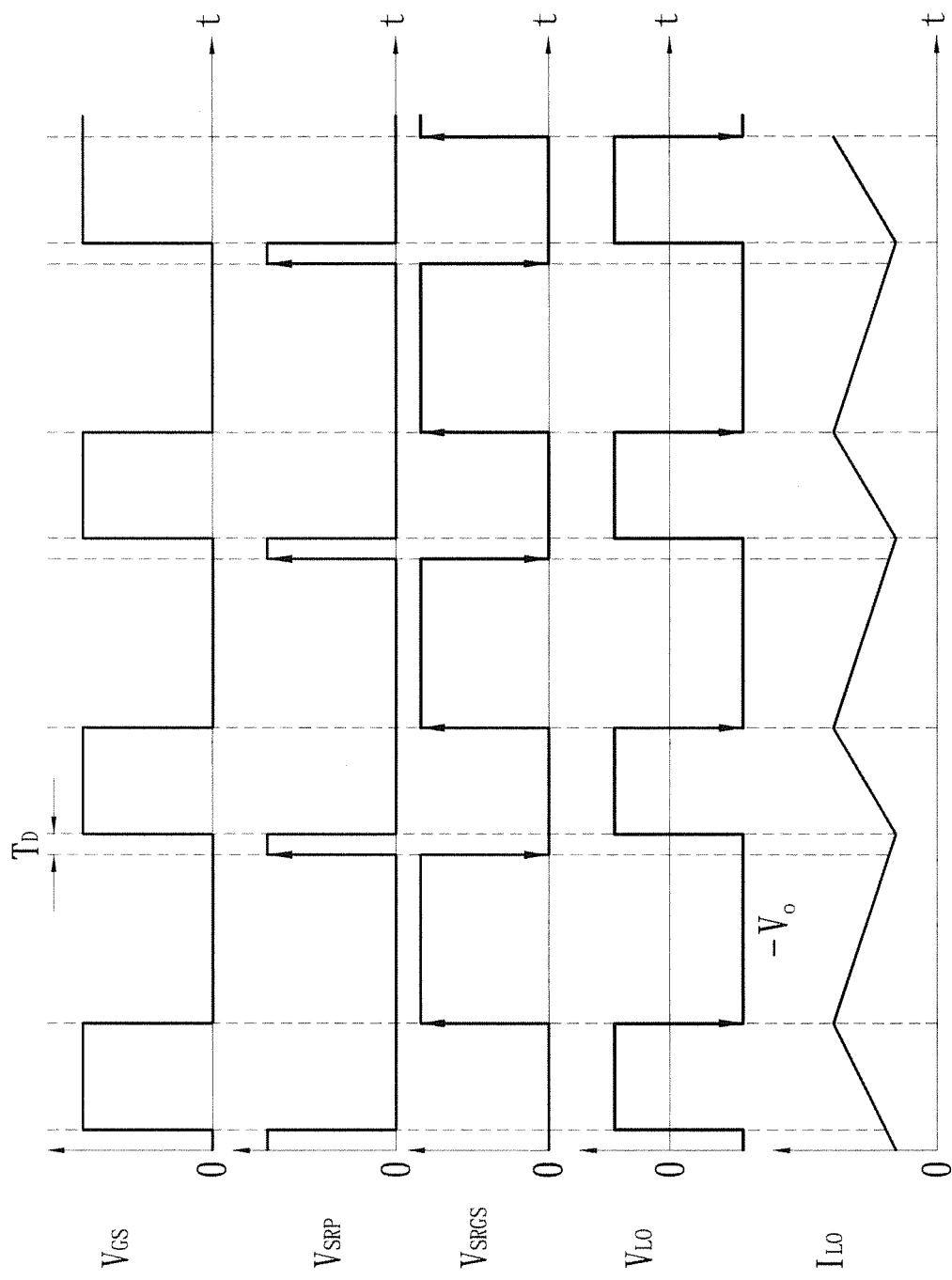
FIG. 9 illustrates waveforms of the first PWM signal $V_{GS}$, the control signal $V_{SRP}$, the second PWM signal $V_{SRGS}$, and the output current $I_{LO}$ and voltage $V_{LO}$ of the output indicator when the first preferred embodiment operates in the CCM.

On the other hand, referring to FIG. 9, under a condition that the synchronous rectifier controller 3 operates in a continuous conduction mode (CCM), similar to the DCM, when the first PWM signal $V_{GS}$ falls from the high logic level to the low logic level so as to control the first switch Q1 to become non-conductive, the second PWM signal $V_{SRGS}$ rises from the low logic level to the high logic level so as to drive the second switch Q2 to become conductive. However, under the condition that the synchronous rectifier controller 3 operates in the CCM, since the first switch Q1 is turned on (i.e., becomes conductive) before the output current $I_{LO}$ drops to zero, and since the second switch Q2 is required to be turned off prior to conduction of the first switch Q1 for preventing the first switch Q1 and the second switch Q2 from conducting at the same time, the control signal $V_{SRP}$ is configured to rise from the low logic level to the high logic level before the first PWM signal $V_{GS}$ rises from the low logic level to the high logic level for turning on the first switch Q1. Subsequently, when the rising edge of the control signal $V_{SRP}$ received at the trigger pin (Trig) triggers the logic circuit 31 of the synchronous rectifier controller 3, the logic circuit 31 generates a low logic level signal to the driver 32 such that the driver 32 of the synchronous rectifier controller 3 outputs at the driving pin (DRV) the second PWM signal $V_{SRGS}$, which falls from the high logic level to the low logic level, for driving the second switch Q2 to become non-conductive prior to conduction of the first switch Q1.

In this way, since a time point at which the second switch Q2 is turned off precedes a time point at which the first switch Q1 is turned on by the dead time $T_D$, it is assured that the first switch Q1 and the second switch Q2 may not conduct at the same time.

Figure 10:
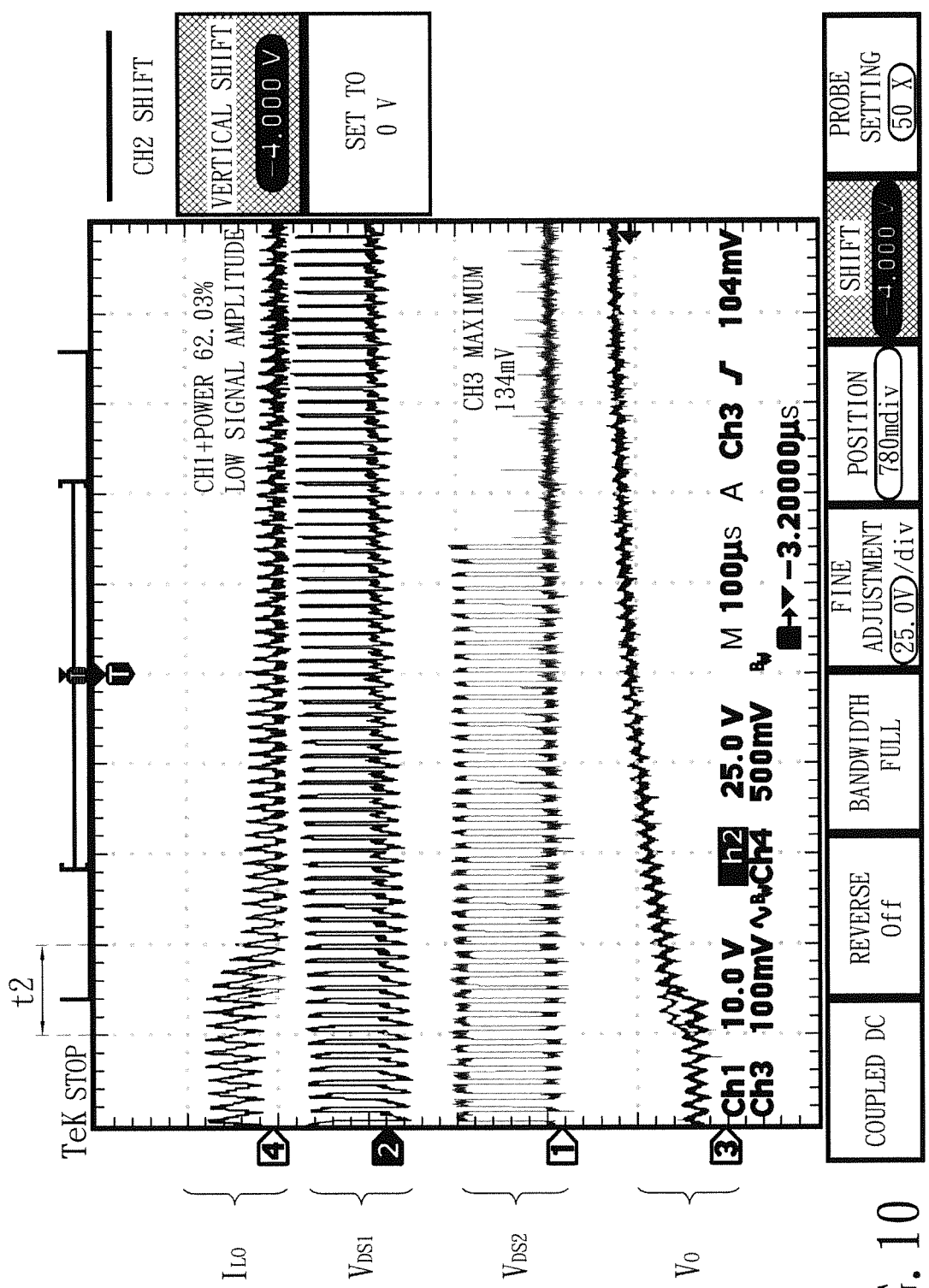
FIG. 10 illustrates that, while the first preferred embodiment operates in the CCM, no voltage spike is generated between a drain terminal and a source terminal of a synchronous rectifier switch within a time interval t2 when a load varies from a heavy load to a light load.

Referring to FIG. 10, within a time interval t2 when a load varies from a heavy load to a light load, since the control signal $V_{SRP}$ is able to trigger the synchronous rectifier controller 3 to turn off the second switch Q2 prior to conduction of the first switch Q1, and since the control signal $V_{SRP}$ is able to trigger the synchronous rectifier controller 3 to turn off the second switch Q2 before the output current $I_{LO}$ drops to zero or close to zero by means of properly selecting the dead time $T_D$ that results from resistance of the resistor R and capacitance of the capacitor C which cooperate to form the delay circuit in the PWM controller 1, the reverse current which results from discharging of the output capacitor $C_o$ toward the second switch Q2 via the output inductor $L_o$ under a condition of a light load may be prevented. Therefore, the second switch Q2 may be free from being subjected to a voltage spike generated between the first end D and the second end S of the second switch Q2 when the load varies rapidly, and there should be no concern whether the second switch Q2 will be damaged because of insufficient voltage tolerance.

In addition, at the moment when the power converting device is shut down without power input, or when the power converting device is just started up, the output current $I_{LO}$ may also drop to zero and have a moment of zero current. In the meantime, the detection pin (CS) of the synchronous rectifier controller 3 is configured to detect that the output current which flows through the output inductor $L_o$ is zero, and subsequently outputs a turn-off signal to the logic circuit 31. The logic circuit 31 generates the low logic level signal to the driver 32 such that the driver 32 outputs via the driving pin (DRV) the second PWM signal which falls from the high logic level to the low logic level, for driving the second switch Q2 to become non-conductive, so as to prevent the generation of the reverse current which results from discharging of the output capacitor $D_o$ toward the output inductor $L_o$ and the second switch Q2.

It is evident from the aforesaid description that, in the first preferred embodiment, by virtue of the control signal $V_{SRP}$ generated based on the initial PWM signal $V_{PWM}$, the synchronous rectifier controller 3 may be triggered thereby to control the second switch Q2 to become non-conductive prior to conduction of the first switch Q1, so that the second switch Q2 may be turned off prior to conduction of the first switch Q1 and prior to generation of reverse current. In this way, when the load varies rapidly, aside from being able to operate in the DCM, the synchronous rectifier controller 3 may also operate normally and stably in the CCM. Moreover, generation of the reverse current may be prevented at the moment when the power converting device is started up.

Figure 11:
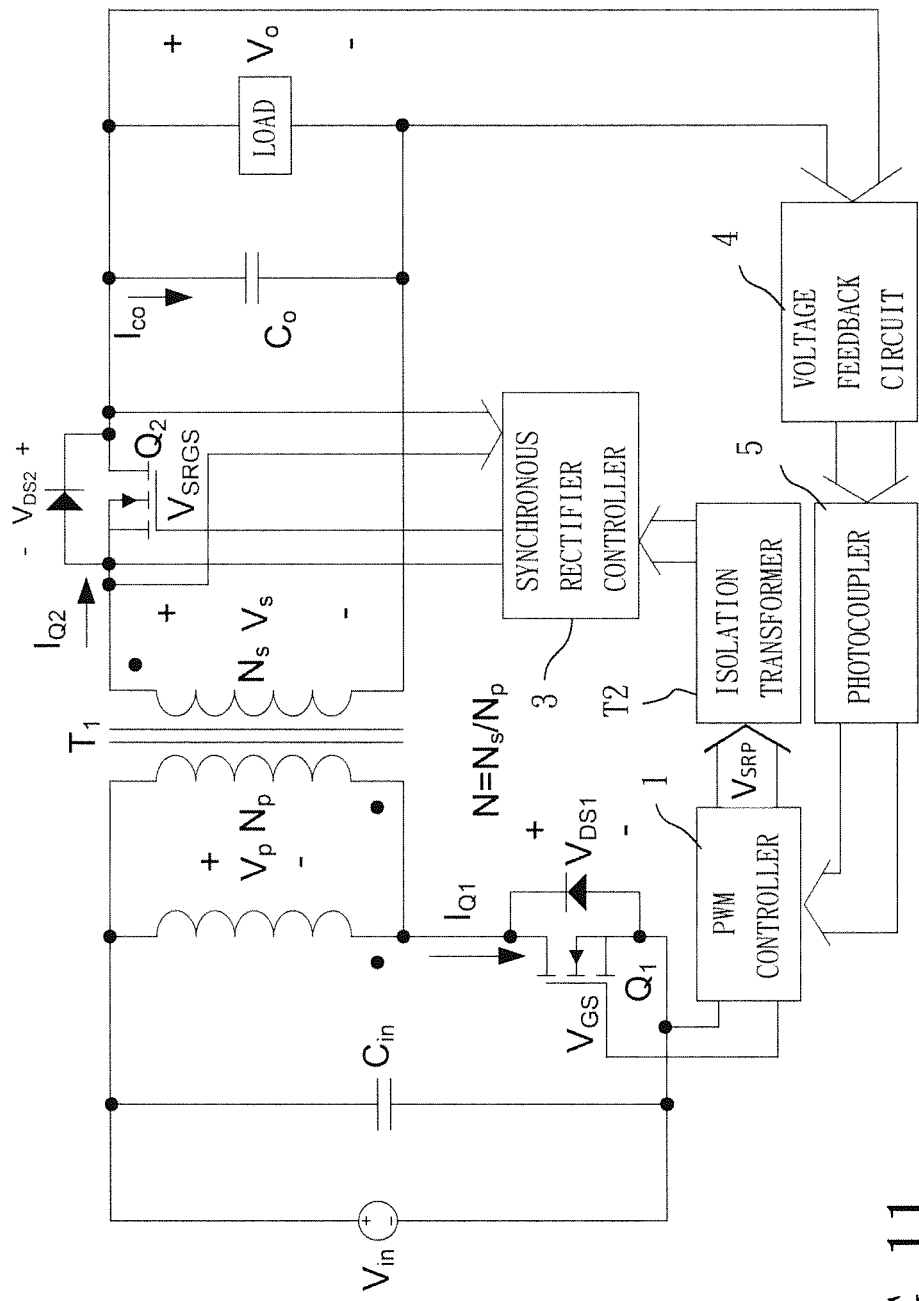
FIG. 11 is a circuit diagram of a flyback converter illustrating a second preferred embodiment of the power converting device of the present invention.

Referring to FIG. 11, a flyback power converter is given as an example for a second preferred embodiment of the power converting device according to the present invention. The second preferred embodiment of the power converting device comprises a transformer T1, a first switch Q1 disposed at a primary side of the transformer T1, a PWM controller 1 adapted to control conduction and non-conduction of the first switch Q1, an output capacitor $C_o$ disposed at a secondary side of the transformer T1, a second switch Q2 disposed at the secondary side and disposed between the transformer T1 and the output capacitor $C_o$, and a synchronous rectifier controller 3 adapted to control conduction and non-conduction of the second switch Q2.

Figure 12:
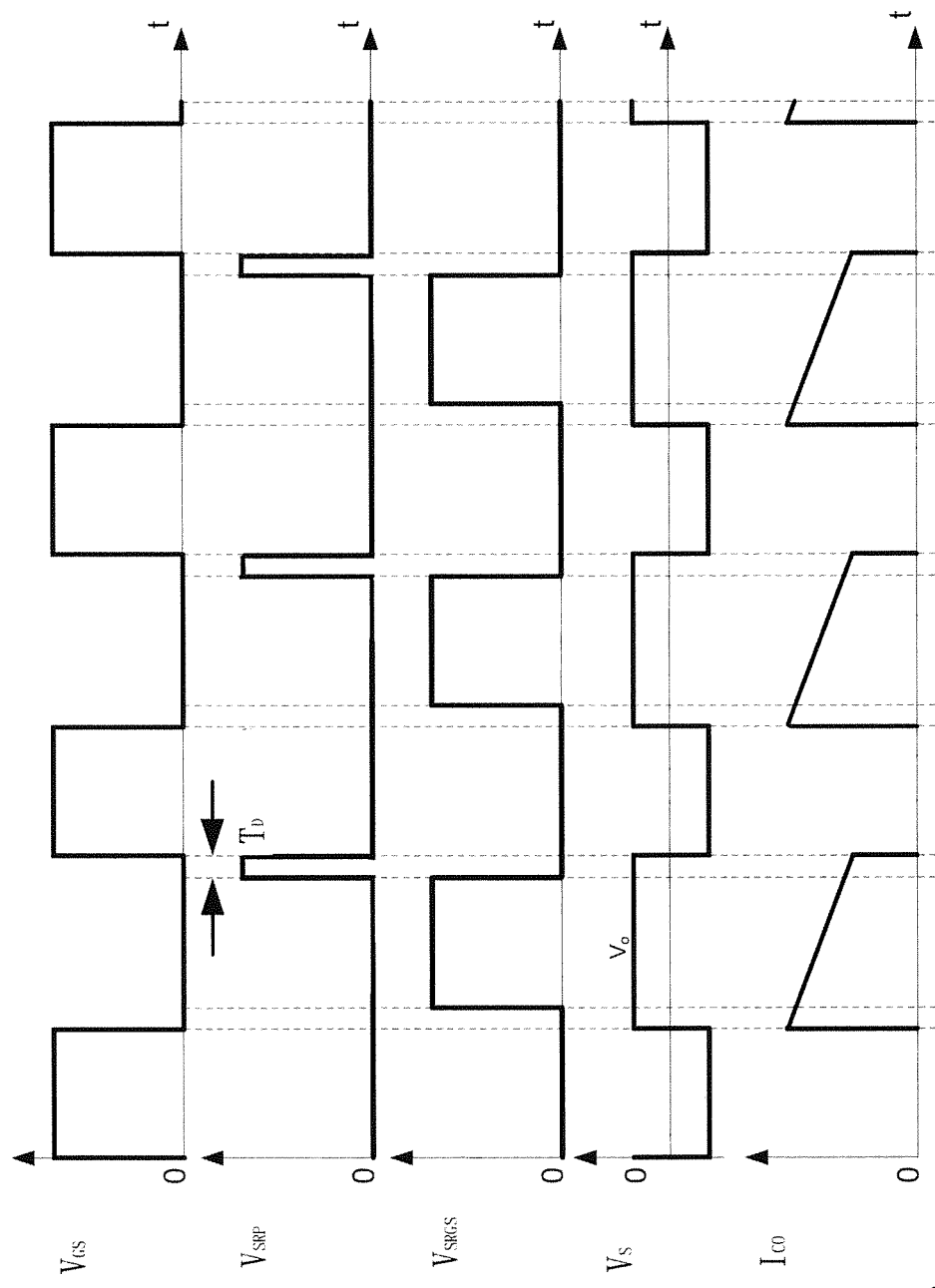
FIG. 12 illustrates waveforms of the first PWM signal $V_{GS}$, the control signal $V_{SRP}$, the second PWM signal $V_{SRGS}$, and the output current $I_{CO}$ and voltage $V_S$ of an output capacitor in the second preferred embodiment.

Similar to the first preferred embodiment, the synchronous rectifier controller 3 of the second preferred embodiment may also be implemented using the existing synchronous rectifier driver of model number NCP4303, and may also generate, by detecting an output current $I_{CO}$, a second PWM signal $V_{SRGS}$ as illustrated in FIG. 12 so as to control the second switch Q2 to operate in the DCM. The PWM controller 1 provides a control signal $V_{SRP}$ to the synchronous rectifier controller 3, and the synchronous rectifier controller 3 is triggered by the control signal $V_{SRP}$ to cause the second PWM signal $V_{SRGS}$ to fall from a high logic level to a low logic level, such that the second switch Q2 is turned off by a dead time $T_D$ before the first PWM signal $V_{GS}$ rises from a low logic level to a high logic level for controlling the first switch Q1 to become conductive. Hence, the first switch Q1 and the second switch Q2 may be prevented from conducting at the same time. Moreover, before the output current $I_{CO}$ drops to zero (e.g., the load varies from a heavy load to a light load), the second switch Q2 is turned off so as to prevent generation of the reverse current, such that the flyback power converter is able to operate normally and stably in the DCM.

Furthermore, it is noted that an existing synchronous rectifier controller of model number STSR30 may be also adopted for implementing the synchronous rectifier controller 3. The existing synchronous rectifier controller of model number STSR30 utilizes an up counter and a down counter of a digital circuit (not shown) to calculate most recent duty cycles of the first switch Q1 and the second switch Q2. The most recent duty cycles thus calculated are adapted to serve as next duty cycles of the first switch Q1 and the second switch Q2, such that the STSR30 is able to operate in the DCM and the CCM. In addition, by means of the control signal $V_{SRP}$ which is generated by the PWM controller 1 and which triggers the synchronous rectifier controller 3 to control the second switch Q2 to become non-conductive prior to conduction of the first switch Q1, effects of preventing the first switch Q1 and the second switch Q2 from conducting simultaneously and preventing generation of the reverse current may be likewise achieved.

Besides, an existing synchronous rectifier controller of model number FAN6204 may be also adopted for implementing the synchronous rectifier controller 3. The existing synchronous rectifier controller of model number FAN6204 is configured to apply the volt-second balance principle, and to calculate charge time and discharge time of a timing capacitor so as to control conduction times of the first switch Q1 and the second switch Q2. That is to say, when the first switch Q1 is conductive, the timing capacitor is charged until the first switch Q1 becomes non-conductive, and subsequently, the timing capacitor starts to discharge, causing the second switch Q2 to become conductive until the timing capacitor discharges completely. In this way, the FAN6204 is able to operate in the DCM and the CCM. In addition, by means of the control signal $V_{SRP}$ which is generated by the PWM controller 1 and which triggers the synchronous rectifier controller 3 to control the second switch Q2 to become non-conductive prior to conduction of the first switch Q1, effects of preventing the first switch Q1 and the second switch Q2 from conducting simultaneously and preventing generation of the reverse current may be achieved as well.

To sum up, in the aforementioned preferred embodiments, the PWM controller 1 generates the control signal $V_{SRP}$ having the rising edge that precedes the rising edge of the first PWM signal $V_{GS}$ by the dead time $T_D$, and the control signal $V_{SRP}$ is provided to the synchronous rectifier controller 3 which controls conduction and non-conduction of the second switch Q2, such that the second switch Q2 is turned off prior to conduction of the first switch Q1 by the dead time $T_D$. In this way, when the synchronous rectifier controller 3 operates in the CCM, the second switch Q2 may be prevented from being subjected to the voltage spike resulting from simultaneous conduction of the first switch Q1 and the second switch Q2, and generation of the reverse current may also be prevented so that the power converting device is able to operate normally and stably in the DCM and CCM. Moreover, generation of the reverse current may be also prevented when the power converting device is shut down.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A power converting device comprising:
   a transformer including a primary winding for receiving an input voltage, and a secondary winding which generates an induced voltage in response to induction associated with receipt of the input voltage by said primary winding;
   a first switch which has a first end coupled electrically to one end of said primary winding, a grounded second end, and a control end;
   a pulse-width modulation (PWM) controller which is coupled electrically to said control end of said first switch, which generates a first PWM signal for controlling conduction and non-conduction of said first switch, and which generates a control signal that leads the first PWM signal;
   a rectifier-filter circuit which is coupled electrically to a first end of said secondary winding and which rectifies the induced voltage so as to generate a direct-current (DC) output voltage;
   a second switch which has a control end, a first end coupled electrically to said rectifier-filter circuit, and a second end that is coupled electrically to a second end of said secondary winding; and
   a synchronous rectifier controller which is coupled electrically to said second switch for controlling conduction and non-conduction of said second switch, and which receives the control signal generated by said PWM controller, so as to control, according to the control signal, said second switch to become non-conductive prior to conduction of said first switch;
   wherein said PWM controller is configured to generate an initial PWM signal, and includes a delay circuit; and
   wherein a rising edge of the initial PWM signal is delayed by said delay circuit for a predetermined time so as to generate a first signal, the first signal and the initial PWM signal being logically combined to generate the control signal which is associated with the initial PWM signal.

2. The power converting device as claimed in claim 1, wherein said PWM controller further includes:
   a first NAND gate having two input terminals that are electrically coupled, and having an output terminal;
   a resistor which has a first end for receiving the initial PWM signal, and which has a second end coupled electrically to the input terminals of said first NAND gate;
   a diode which is connected in parallel with said resistor and which blocks input of the initial PWM signal to said first NAND gate therethrough;
   a capacitor having a first end that is coupled electrically to the input terminals of said first NAND gate, and having a grounded second end, said capacitor cooperating with said resistor to form said delay circuit;
   a second NAND gate having two input terminals that are coupled electrically to the output terminal of said first NAND gate, and having an output terminal;
   a third NAND gate having a first input terminal that is coupled electrically to the output terminal of said first NAND gate, having a second input terminal for receiving the initial PWM signal, and having an output terminal; and
   a fourth NAND gate having two input terminals that are coupled electrically to the output terminal of said third NAND gate, and having an output terminal;
   wherein the initial PWM signal with the delayed rising edge is being inputted to said first NAND gate such that the first signal is outputted therefrom, the first signal being inputted to said second NAND gate such that the first PWM signal is outputted at the output terminal of said second NAND gate; wherein the first signal and the initial PWM signal are inputted to said third NAND gate such that a second signal is outputted therefrom, the second signal being inputted to said fourth NAND gate such that the control signal is outputted at the output terminal of said fourth NAND gate.

3. The power converting device as claimed in claim 1, further comprising an isolation transformer which is coupled electrically between said PWM controller and said synchronous rectifier controller, said synchronous rectifier controller receiving the control signal from said PWM controller via said isolation transformer.

4. The power converting device as claimed in claim 1, which is a forward converter.

5. The power converting device as claimed in claim 1, which is a flyback converter.

6. The power converting device as claimed in claim 1, wherein each of said first and second switches is a metal oxide semiconductor transistor.

7. The power converting device as claimed in claim 1, wherein said synchronous rectifier controller is configured to detect a voltage at the first end of said second switch, and is configured to generate, based on the voltage thus detected, a second PWM signal for controlling conduction and non-conduction of said second switch.

8. The power converting device as claimed in claim 7, wherein said synchronous rectifier controller includes:
   a power source pin coupled electrically to said rectifier-filter circuit for receiving the DC output voltage;
   a trigger pin for receiving the control signal;
   a detection pin for detecting the voltage at the first end of said second switch; and
   a driving pin which is coupled electrically to the control end of said second switch and which outputs the second PWM signal for controlling conduction and non-conduction of said second switch.

9. The power converting device as claimed in claim 8, wherein said synchronous rectifier controller further includes a logic circuit and a driver that is coupled electrically to said logic circuit and said driving pin, said detection pin and said trigger pin being coupled electrically to said logic circuit; and
   wherein, under a condition that said synchronous rectifier controller operates in a discontinuous conduction mode (DCM),
   when the voltage detected at the first end of said second switch drops to cause an electric potential at said detection pin to be lower than a predetermined conduction threshold voltage, said logic circuit generates a high logic level signal to said driver such that said driver outputs via said driving pin the second PWM signal for driving said second switch to become conductive, and
   when the voltage detected at the first end of said second switch rises to cause the electric potential at said detection pin to be higher than a predetermined non-conduction threshold voltage, said logic circuit generates a low logic level signal to said driver such that said driver outputs via said driving pin the second PWM signal for driving said second switch to become non-conductive.

10. The power converting device as claimed in claim 8, wherein, under a condition that said synchronous rectifier controller operates in a continuous conduction mode (CCM), the control signal received at said trigger pin triggers said synchronous rectifier controller such that said synchronous rectifier controller outputs the second PWM signal for driving said second switch to become non-conductive prior to conduction of said first switch.

11. The power converting device as claimed in claim 10,
   wherein said synchronous rectifier controller further includes a logic circuit and a driver that is coupled electrically to said logic circuit and said driving pin, said detection pin and said trigger pin being coupled electrically to said logic circuit,
   wherein, when the voltage detected at the first end of said second switch drops to cause an electric potential at said detection pin to be lower than a predetermined conduction threshold voltage, said logic circuit generates a high logic level signal to said driver such that said driver outputs via said driving pin the second PWM signal for driving said second switch to become conductive, and
   wherein, when the control signal received at said trigger pin triggers said logic circuit, said logic circuit generates a low logic level signal to said driver such that said driver outputs the second PWM signal for driving said second switch to become non-conductive prior to conduction of said first switch.

12. The power converting device as claimed in claim 1, wherein, under a condition that said synchronous rectifier controller operates in a discontinuous conduction mode (DCM), said synchronous rectifier controller, by calculating most recent duty cycles of said first switch and said second switch, is configured to generate a second PWM signal for controlling conduction and non-conduction of said second switch.

13. The power converting device as claimed in claim 12, wherein the most recent duty cycles calculated by said synchronous rectifier controller are used to serve as next duty cycles of said first switch and said second switch and to generate the second PWM signal.

14. The power converting device as claimed in claim 1, wherein said synchronous rectifier controller is configured to apply the volt-second balance principle, and to calculate charge time and discharge time of a timing capacitor so as to generate a second PWM signal for controlling conduction and non-conduction of said second switch.

15. The power converting device as claimed in claim 1, wherein the control signal is generated to have a pulse width equal to the predetermined time delay of the delay circuit.

* * * * *